US011032862B2

(12) United States Patent
Kang

(10) Patent No.: US 11,032,862 B2
(45) Date of Patent: Jun. 8, 2021

(54) DEVICE AND COMMUNICATION CONNECTION METHOD FOR CONNECTING MULTIPLE DEVICES

(71) Applicant: Samsung Electronics Co., Ltd., Suwon-si (KR)

(72) Inventor: Hee-jun Kang, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/923,362

(22) Filed: Mar. 16, 2018

(65) Prior Publication Data

US 2018/0295662 A1 Oct. 11, 2018

(30) Foreign Application Priority Data

Apr. 11, 2017 (KR) ........................ 10-2017-0046844

(51) Int. Cl.
*H04W 72/04* (2009.01)
*H04W 76/15* (2018.01)
(Continued)

(52) U.S. Cl.
CPC ............ *H04W 76/15* (2018.02); *H04W 76/11* (2018.02); *H04W 88/08* (2013.01)

(58) Field of Classification Search
CPC ...... H04W 76/15; H04W 76/11; H04W 88/08
See application file for complete search history.

(56) References Cited

U.S. PATENT DOCUMENTS 7,580,701 B2 * 8/2009 Ross .................... H04L 63/104
455/411
7,738,891 B2 * 6/2010 Tenhunen ............. H04M 15/55
370/310
(Continued)

FOREIGN PATENT DOCUMENTS

EP 2 611 079 A1 7/2013
EP 2 887 718 A1 6/2015
(Continued)

OTHER PUBLICATIONS

Texas Instruments, CC3000 Smart Config, https://web.archive.org/web/20150214090130/http://processors.wiki.ti.com/index.php/CC3000_Smart_Config, Apr. 22, 2014.
(Continued)

*Primary Examiner* — Tejis Daya
*Assistant Examiner* — Mahbubul Bar Chowdhury
(74) *Attorney, Agent, or Firm* — Jefferson IP Law, LLP

(57) ABSTRACT

A device for controlling a communication interface and a method therefor are provided. The device includes a communication interface, a memory, and a processor to control the communication interface and the memory. The memory may store instructions that, when executed by the processor, cause the processor to perform the operations of connecting with an electronic apparatus via the communication interface by using first data stored in the memory, receiving identification information of an access point from the electronic apparatus, connecting with the access point by using the identification information of the access point, connecting with a server by using the identification information of the access point, receiving second identification information of the electronic apparatus from the server and storing the received second identification information in the memory, and when disconnected from the access point, connecting (Continued)

with the electronic apparatus by using the second identification information.

8 Claims, 11 Drawing Sheets

(51) Int. Cl.
*H04W 76/11* (2018.01)
*H04W 88/08* (2009.01)

(56) References Cited

U.S. PATENT DOCUMENTS

| | | | |
|---|---|---|---|
| 8,126,476 B2* | 2/2012 | Vardi | H04W 72/02 |
| | | | 455/456.1 |
| 9,686,094 B2 | 6/2017 | Kim et al. | |
| 9,992,037 B2 | 6/2018 | Lim et al. | |
| 9,992,677 B2 | 6/2018 | Kim et al. | |
| 10,002,524 B2 | 6/2018 | Shim et al. | |
| 2007/0066304 A1* | 3/2007 | Lee | H04W 48/20 |
| | | | 455/436 |
| 2010/0278158 A1* | 11/2010 | Lee | H04W 48/20 |
| | | | 370/338 |
| 2011/0106279 A1 | 5/2011 | Cho et al. | |
| 2013/0185813 A1* | 7/2013 | Shim | G06F 8/654 |
| | | | 726/29 |
| 2013/0286889 A1* | 10/2013 | Cherian | H04L 63/18 |
| | | | 370/254 |
| 2014/0167929 A1 | 6/2014 | Shim et al. | |
| 2014/0254577 A1* | 9/2014 | Wright | H04W 12/04 |
| | | | 370/338 |
| 2015/0023183 A1* | 1/2015 | Ilsar | H04W 48/16 |
| | | | 370/244 |
| 2015/0087278 A1 | 3/2015 | Kim et al. | |
| 2015/0089624 A1* | 3/2015 | Kim | G06F 21/44 |
| | | | 726/9 |
| 2015/0097689 A1 | 4/2015 | Logue et al. | |
| 2016/0037436 A1* | 2/2016 | Spencer | H04W 48/12 |
| | | | 370/338 |
| 2016/0037564 A1* | 2/2016 | Borden | H04W 76/10 |
| | | | 370/254 |
| 2016/0073259 A1* | 3/2016 | Lee | G06F 3/04842 |
| 2016/0234213 A1 | 8/2016 | Kim et al. | |
| 2017/0006471 A1 | 1/2017 | Kim et al. | |
| 2017/0019266 A1 | 1/2017 | Lim et al. | |
| 2017/0079079 A1* | 3/2017 | Pathuri | H04L 41/0803 |
| 2017/0094706 A1* | 3/2017 | Kim | H04W 4/70 |
| 2017/0250835 A1 | 8/2017 | Kim et al. | |
| 2017/0303320 A1* | 10/2017 | Meng | H04W 76/11 |

FOREIGN PATENT DOCUMENTS

| | | |
|---|---|---|
| KR | 10-2005-0005125 A | 1/2005 |
| KR | 10-2011-0047764 A | 5/2011 |
| KR | 10-2014-0077127 A | 6/2014 |
| KR | 10-1418255 B1 | 8/2014 |
| KR | 10-2015-0033569 A | 4/2015 |
| KR | 10-2015-0073057 A | 6/2015 |
| KR | 10-2015-0109059 A | 10/2015 |
| KR | 10-1566339 B1 | 11/2015 |
| KR | 10-2016-0009207 A | 1/2016 |
| KR | 10-2016-0063666 A | 6/2016 |
| WO | 2015/093887 A1 | 6/2015 |
| WO | 2016/107726 A1 | 7/2016 |
| WO | 2016/172538 A1 | 10/2016 |

OTHER PUBLICATIONS

Texas Instruments, Gil Reiter, A primer to Wi-Fi provisioning for IoT applications, Dallas, Texas, 2014.

George Hawkins: "How does TI CC3000 wifi smart config work?", Oct. 14, 2013 (Oct. 14, 2013), Retrieved from the Internet: URL:https://electronics.stackexchange.com/questions/61704/ how-does-ti-cc3000-wifi-smart-config-work [retrieved on Dec. 7, 2018].

Olaf Bergmann et al: "Secure bootstrapping of nodes in a CoAP network", Wireless Communications and Networking Conference Workshops (WCNCW), 2012 IEEE, IEEE, Apr. 1, 2012 (Apr. 1, 2012), pp. 220-225, XP032185788, DOI: 10.1109/WCNCW.2012. 6215494 ISBN: 978-1-4673-0681-2.

European Office Action dated Dec. 19, 2018; Application #: 18 163 409.8-1231; Ref. #: SET/87296EP1.

"Transportation Systems and Engineering: Concepts, Methodologies, Tools, and Applications: Concepts, Methodologies, Tools, and Applications", Jun. 30, 2015, IGI Global, ISBN: 9781466684744, p. 826.

European Summons to Oral Proceedings dated May 28, 2019, issued in European Patent Application No. 18163409.8.

European Brief Communication dated Nov. 14, 2019, issued in European Patent Application No. 18163409.8.

Korean Office Action dated Apr. 19, 2021, issued in Korean Application No. 10-2017-0046844.

* cited by examiner

DEVICE AND COMMUNICATION CONNECTION METHOD FOR CONNECTING MULTIPLE DEVICES

CROSS-REFERENCE TO RELATED APPLICATION(S)

This application is based on and claims priority under 35 U.S.C. § 119 to Korean Patent Application No. 10-2017-0046844, filed on Apr. 11, 2017, in the Korean Intellectual Property Office, the disclosure of which is incorporated by reference herein in its entirety.

TECHNICAL FIELD

The disclosure relates to a communication connection method of a device.

BACKGROUND

The advancement of the wireless communication technology and semiconductor technology has enabled various devices used in households to include a communication interface and be connected to a server. These devices may be connected to a server via an access point (hereinafter referred to as "AP"), and a communication setting is required to connect a device to an AP.

The above information is presented as background information only to assist with an understanding of the disclosure. No determination has been made, and no assertion is made, as to whether any of the above might be applicable as prior art with regard to the disclosure.

SUMMARY

To connect a device with an access point (AP), a communication setting operation to input identification information (for example, a service set identifier (SSID) of the AP) of the AP in a device is required, and to perform communication setting with respect to a single device, typically, it may take 70 to 80 seconds. In particular, a plurality of devices is to be connected to the AP, a repetitive communication setting operation is required, which may take longer time.

In a case in which the device is disconnected with communication connection due to the change of AP, etc., it is necessary that a communication setting operation to connect the device with the AP is performed again. If there are many devices to be connected with the same AP, it is necessary that such communication setting operation is repeatedly performed, which is inconvenient.

Aspects of the disclosure are to address at least the above-mentioned problems and/or disadvantages and to provide at least the advantages described below. Accordingly, an aspect of the disclosure is to provide an apparatus and method for controlling a communication interface.

In an embodiment, a communication setting can be collectively, that is, substantially simultaneously, performed to a plurality of household devices by using an electronic apparatus such as a smartphone.

In addition, the communication setting information is shared with family members so that the family members may control peripheral devices without performing additional communication setting operation.

In addition, in a case in which it is necessary to perform a communication setting operation with the AP again due to the replacement of the AP or due to the disconnection with the AP, a communication setting operation may be readily carried out.

In accordance with an aspect of the disclosure, a communication setting supporting method of an electronic apparatus is provided. The communication setting supporting method includes operations of storing identification information of an access point, broadcasting identification of an electronic apparatus via a communication interface, detecting, by the electronic apparatus, that the first device and the second device are communicatively connected with the electronic apparatus based on the identification information of the electronic apparatus, and substantially simultaneously transmitting the identification information of the access point to the first device communicatively connected with the electronic apparatus and the second device communicatively connected with the electronic apparatus.

The identification information of the access point may include an SSID of the access point.

The identification information may include an SSID of the electronic apparatus.

The communication setting supporting method of the electronic apparatus may further include an operation of transmitting one or more device connected with the electronic apparatus to a server.

In accordance with another aspect of the disclosure, a communicative connection method of a device is provided. The communicative connection method includes operations of connecting with an electronic apparatus by using a first data stored in a memory, receiving identification information of an access point from the electronic apparatus, connecting with the access point by using the identification information of the access point received from the electronic apparatus, and connecting with a server via the access point.

The predetermined identification information may include at least one from among an SSID and a password of the electronic apparatus.

The predetermined identification information may be stored in a memory of the device at the time of the manufacturing of the device.

The communicative connection method of the device may include, receiving second identification information of the electronic apparatus from the server and storing the memory, and in response to being disconnected from the access point, communicatively connecting with the electronic apparatus by using the second identification information.

In accordance with another aspect of the disclosure, a device management method of a device management system is provided. The device management method includes the operations of storing, by an electronic apparatus, identification information of an access point, broadcasting, by the electronic apparatus, identification information of the electronic apparatus, connecting, by one or more device, with the electronic apparatus by using the identification information of the electronic apparatus, transmitting, by the electronic apparatus, the identification information of the access point to the one or more device communicatively connected with the electronic apparatus, and connecting, by the one or more device, with the access point by using the identification information of the access point received from the electronic apparatus.

The method may include an operation of accessing, by the one or more device, a user account of a server via the access point, and an operation of registering, by the server, the one or more device.

In accordance with another aspect of the disclosure, an electronic apparatus is provided. The electronic apparatus includes a communication interface, a memory, and at least one processor configured to control the communication interface and the memory. The memory may store instructions that, when executed by the at least one processor, cause the at least one processor, causes the at least one processor to store identification of a communicatively-connected AP, broadcast predetermined identification information of the electronic apparatus via the communication interface based on a user input, detect that one or more device receiving identification information of the electronic apparatus is connected with the electronic apparatus by using the identification information of the electronic apparatus, and transmit the identification information of the access point to one or more device connected with the electronic apparatus.

The identification information of the access point may include an SSID of the access point.

The identification information may include an SSID of the electronic apparatus.

The memory may include an instruction to perform an operation of transmitting information relating to one or more device connected with the electronic apparatus to a server.

In accordance with another aspect of the disclosure, a device is provided. The device includes a communication interface, a memory, and at least one processor configured to control the communication interface and the memory. The memory may store instructions and, in response to the at least one processor executing the instructions, the at least one processor is configured to perform an operation of connecting with an electronic apparatus by using predetermined identification information, an operation of receiving identification information of an access point from the electronic apparatus, an operation of connecting with the access point by using the identification information of the access point received from the electronic apparatus, and an operation of connecting with a server via the access point.

The predetermined identification information may include at least one from among an SSID and a password of the electronic apparatus.

The predetermined identification information may be stored in a memory of the device at the time of the manufacturing of the device.

The memory may store an instruction to, in response to the processor executing the instruction, perform an operation of receiving second identification information of the electronic apparatus from the server, and an operation of, in response to being disconnected from the access point, connecting with the electronic apparatus by using the second identification information.

In accordance with another aspect of the disclosure, a system is provided. The system includes a first device, a second device, an electronic apparatus configured to support communication setting of the first device and the second device, and an access point. The electronic apparatus may store identification information of the access point in a memory of the electronic apparatus, and broadcast identification of the electronic apparatus. The first device and the second device may be communicatively connected with the electronic apparatus based on identification information of the electronic apparatus. The electronic apparatus may substantially simultaneously transmit the identification information of the access point to the communicatively-connected first device and the communicatively-connected second device. The first device and the second device may be communicatively connected with the access point by using the identification information of the access point.

The system may further include a server. The first device and the second device may access the server via the access point. The server may transmit second identification information of the electronic apparatus to the first device, the second device and the electronic apparatus. The first device and the second device may, in response to being disconnected from the server, be communicatively connected with the electronic apparatus by using the second identification information.

In accordance with another aspect of the disclosure, a device is provided. The device includes a communication interface, a memory, and at least one processor configured to control the communication interface and the memory. The memory may store an instruction and, in response to the at least one processor executing the instructions, the at least one processor is configured to perform operations of connecting with an electronic apparatus via the communication interface by using first data stored in the memory, receiving identification information of an access point from the electronic apparatus, connecting with the access point by using the identification information of the access point received from the electronic apparatus, connecting with a server via the access point, receiving second identification information of the electronic apparatus from the server and storing the received second identification information in the memory, and in response to being disconnected from the access point, connecting with the electronic apparatus by using the second identification information. The first data may be stored in a memory of the device at the time of the manufacturing of the device. The first data may include identification information of the electronic apparatus.

In accordance with another aspect of the disclosure, an electronic apparatus which supports communicative connection of a first device and a second device and allow the first device and the second device to be connected with an access point is provided. The electronic apparatus includes a communication interface, a memory, and a processor configured to control the communication interface and the memory. The memory may store an instruction to control the electronic apparatus to perform the operations of, in response to the processor executing the instruction, storing identification information of the access point in a memory of the electronic apparatus, broadcasting identification information of the electronic apparatus via the communication interface, detecting that the first device and the second device are connected with the electronic apparatus based on the identification information of the electronic apparatus, and substantially simultaneously transmitting the identification information of the access point to the first device connected with the electronic apparatus and the second device connected with the electronic apparatus.

The identification information of the access point may include an SSID of the access point. The identification information of the electronic apparatus may include an SSID of the electronic apparatus.

The memory may, in response to the processor executing the instruction, transmit information relating to the first device communicatively connected with the electronic apparatus and the second device communicatively connected with the electronic apparatus to a server. According to an aspect of an embodiment, there is provided a computer program product may include a computer readable recording medium of which stored a program to perform the operations of storing identification information of an access point in a memory, broadcasting identification information of an electronic apparatus, detecting, by the electronic apparatus, that a first device and a second device are communicatively connected with the electronic apparatus based on the identification information of the electronic apparatus, and substantially simultaneously transmitting the identification information of the access point to the first device communicatively connected with the electronic apparatus and the second device communicatively connected with the electronic apparatus.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
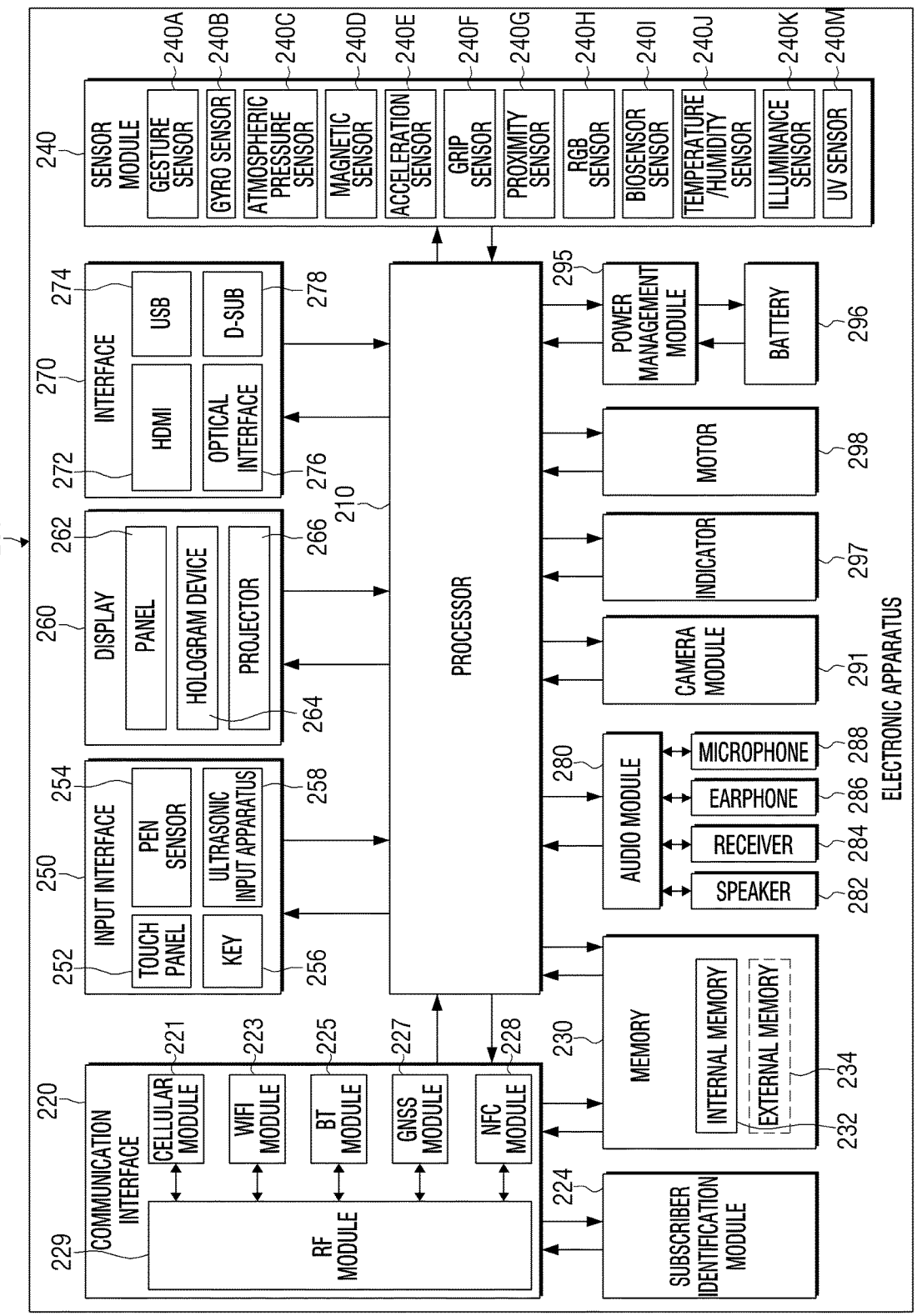
FIG. 1 is a block diagram of an electronic apparatus according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this disclosure, expressions such as "A or B" or "at least one of A and/or B" and the like may include all possible combinations of the items listed together. Expressions such as "first" or "second," and the like, may express their components irrespective of their order or importance and may be used to distinguish one component from another, but is not limited to these components. When it is mentioned that some (e.g., first) component is "(functionally or communicatively) connected" or "accessed" to another (second) component", the component may be directly connected to the other component or may be connected through another component (e.g., a third component).

In this disclosure, "configured to (or set to)" as used herein may, for example, be used interchangeably with "suitable for", "having the ability to", "altered to", "adapted to", "capable of" or "designed to" in hardware or software. Under certain circumstances, the term "device configured to" may refer to "device capable of" doing something together with another device or components. For example, "a processor configured (or set) to perform A, B, and C" may refer to an exclusive processor (e.g., an embedded processor) for performing the corresponding operations, or a general-purpose processor (e.g., a central processing unit (CPU) or an application processor (AP)) capable of performing the corresponding operations by executing one or more software programs stored in a memory device.

An electronic apparatus according to the various embodiments may include, for example, at least one of a smartphone, a tablet personal computer (PC), a desktop PC and a television (TV).

A device according to the various embodiments may include at least one of, for example, a refrigerator, an air conditioner, a cleaner, an oven, a microwave, a washing machine and an air purifier.

In the disclosure, the term "user" may refer to a person using an electronic device or a device using an electronic device (e.g., an artificial intelligence electronic device).

FIG. 1 is a block diagram of an electronic apparatus according to an embodiment of the disclosure.

The electronic apparatus 201 may, for example, include at least one processor 210 (e.g. AP), a communication interface 220, a subscriber identification module (SIM) 224, a memory 230, a sensor module 240, an input interface 250, a display 260, an interface 270, an audio module 280, a camera module 291, a power management module 295, a battery 296, an indicator 297, and a motor 298. The processor 210 may, for example, control a number of hardware or software elements connected to the processor 210 by driving an operating system or application program, and perform various data processing and calculations.

The controller 210 may control the communication interface 220 and the memory 230.

The processor 210, for example, may be realized as a system on chip (SoC). According to an embodiment, the processor 210 may further include a graphics processing unit (GPU) and/or an image signal processor (ISP). The processor 210 may include at least some among elements illustrated in FIG. 1 (e.g., cellular module 221). The processor 210 may load and process commands or data received from at least one of the other components (e.g., non-volatile memory) into volatile memory and store the resulting data in non-volatile memory.

The communication interface 220 may, for example, include a cellular module 221, a WiFi module 223, a Bluetooth module 225, a global navigation satellite system (GNSS) module 227, a near field communication (NFC) module 228, and a radio frequency (RF) module 229. The cellular module 221, for example, may provide a voice call, a video call, a text service, or internet service via a communication network. According to an embodiment, the cellular module 221 may perform a discrimination and an authentication for the electronic apparatus 201 in a communication network by using a subscriber identification module (SIM) 224 (e.g., SIM card). According to an embodiment, the cellular module 221 may perform at least a part of the functions which can be provided by the processor 210. According to an embodiment, the cellular module 221 may include a communication processor (CP). According to an embodiment, at least some of (e.g., more than two) the cellular module 221, WiFi module 223, Bluetooth (BT) module 225, GNSS module 227 and NFC module 228 may be included in an integrated chip (IC) or an IC package. The RF module 229, for example, may send and receive a communication signal (e.g., RF signal). The RF module 229, for example, may include a transceiver, a power amp module (PAM), a frequency filer, a low noise amplifier (LNA), or an antenna and the like. According to an embodiment, at least one of the cellular module 221, WiFi module 223, Bluetooth module 225, GNSS module 227 and NFC module 228 may be send and receive the RF signal through a separate RF module. The SIM 224 may, for example, include a card including a SIM or an embedded SIM, and may include an exclusive identification information (e.g., integrated circuit card identifier (ICCID) or subscriber information (e.g., international mobile subscriber identity (IMSI).

The memory 230 (e.g., memory 130) may, for example, include an internal memory 232 or an external memory 234. The internal memory 232 may include at least one of, for example, a volatile memory (e.g., a dynamic random access memory (DRAM), a static RAM (SRAM), or a synchronous dynamic RAM (SDRAM)), a nonvolatile memory (e.g., an one time programmable read-only memory (OTPROM), a programmable ROM (PROM), an erasable programmable ROM (EPROM), an electrically erasable programmable ROM (EEPROM), a mask ROM, a flash ROM, a flash memory, a hard drive, and a solid state drive (SSD). The external memory 234 may further include a flash drive, such as a compact flash (CF), a secure digital (SD), a micro secure digital (micro-SD), a mini secure digital (mini-SD), an extreme digital (xD), a multi-media card (MMC), or a memory stick. The external memory 234 may be connected functionally or physically to the electronic apparatus 201 through a variety of interfaces.

The memory 230 may store an instruction to perform an operation of, when the processor is executed 210, storing identification information of an access point of an electronic apparatus, broadcasting identification information of the electronic apparatus via the communication interface, detecting, by the electronic apparatus, that a first device and a second device are connected to the electronic apparatus based on the identification information of the electronic apparatus, and substantially simultaneously transmitting the identification information of the access point to the first device and second device connected to the electronic apparatus. The identification information of the access point may include a service set identifier (SSID) of the access point. The identification information of the electronic apparatus may include an SSID of the electronic apparatus.

The memory 230 may store an instruction that performs an operation of transmitting information relating to a first device and second device communicatively connected to the electronic apparatus to a server when the processor 210 is executed. The sensor module 240 may, for example, measure a physical quantity or an operation state of the electronic apparatus 201 and convert the measured or detected information to an electrical signal. The sensor module 240 may include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., red, green, blue (RGB) sensor), a biosensor 240I, a temperature/humidity sensor 240J, an illuminance sensor 240K, and an ultraviolet (UV) sensor 240M. Additionally or alternatively, the sensor module 240, for example, may include an e-nose sensor, an electromyographic (EMG) sensor, an electroencephalogram (EEG) sensor, an electrocardiogram (ECG) sensor, an infrared (IR) sensor, an iris sensor and/or a fingerprint sensor. The sensor module 240 may further include a control circuit to control at least one or more sensors therein. According to an embodiment, the electronic apparatus 201 may further include a processor configured to control the sensor module 240 as part of the processor 210 or additionally, and control the sensor module 240 while the processor 210 is in a sleeping state.

The input interface 250 may, for example, include a touch panel 252, a digital pen sensor 254, a key 256, or an ultrasonic input apparatus 258. The touch panel 252 may, for example, use at least one of electrostatic type, pressure sensitive type, infrared type, and an ultraviolet type. The touch panel 252 may further include a control circuit. The touch panel 252 may further include a tactile layer to provide a tactile response to a user. The (digital) pen sensor 254, for example, may be part of a touch panel or include a separate detection sheet. The key 256, for example, may include a physical button, an optical key, or a keypad. The ultrasonic input device 258 may detect ultrasonic waves generated by an input tool, via a microphone (e.g., microphone 288), and may check the data corresponding to the detected ultrasonic waves.

The display 260 may include the panel 262, the hologram device 264, or the projector 266 and/or a control circuit to control them. The display 260, for example, may include a liquid crystal display (LCD), a light-emitting diode (LED) display, an organic light-emitting diode (OLED) display, a microelectromechanical systems (MEMS) display, or an electronic paper display. The display 260, for example, may display a variety of contents (e.g., text, image, video, icon and/or symbol) to a user. The display 260 may include a touch screen, and may receive the inputs, for example, a touch, a gesture, a proximity indication or a hovering input using an electronic pen or a user's body part.

The panel 262, for example, may be flexible, transparent or wearable. The panel 262 may be configured to include the touch panel 252 and one or more modules. According to an embodiment, the panel 262 may include a pressure sensor (or a force sensor) which may measure intensity of pressure with respect to a user touch. The pressure sensor may be realized to be integrated with the touch panel 252 or as one or more sensors separated from the touch panel 252. The hologram device 264 can display a stereoscopic image in the air using interference of light. The projector 266 may project light onto a screen to display an image. The screen may, for example, be located within or outside the electronic apparatus 201. The interface 270, for example, may include a high-definition multimedia interface (HDMI) 272, a universal serial bus (USB) 274, an optical interface 276, or a D-subminiature 278.

Additionally or alternatively, the interface 270, for example, may include a mobile high-definition link (MHL) interface, a secure digital (SD) card/multi-media card (MMC) interface, or Infrared data association (IrDA) standard interface.

The audio module 280, for example, may convert sound and an electrical signal in bilateral directions. The audio module 280 may process sound information inputted or outputted through, for example, a speaker 282, a receiver 284, earphones 286, a microphone 288, or the like. The camera module 291, for example, may be an apparatus which is capable of photographing a still image and a video, and according to an embodiment, may include one or more image sensor (e.g., front surface sensor or rear surface sensor), a lens, an image signal processor (ISP), or a flash (e.g., LED, xenon lamp and the like). The power management module 295, for example, may manage the power of the electronic apparatus 201. According to an embodiment, the power management module 295 may include a power management integrated circuit (PMIC), a charger integrated circuit (IC), a battery 296 (e.g., a battery including a charge gauge), or a fuel gauge. The PMIC may use a wired and/or wireless charging method. A wireless charging method, for example, may include a magnetic resonance method, a self-induction method, or an electromagnetic wave method, and may further include an additional circuit for a wireless charging, for example, a coil loop, a resonant circuit, or a rectifier, etc. The battery gauge may, for example, measure remaining amount of the battery 296, a voltage during charging, the current, or the temperature. The battery 296, for example, may include a rechargeable battery and/or a solar battery.

The indicator 297 may display a particular state, for example, a booting state, a messaging state, a charging state, or etc., of the electronic apparatus 201 or of part of the electronic apparatus 201 (e.g. processor 210). The motor 298 may convert an electrical signal into a mechanical vibration, and generate vibration, haptic effect, or the like. The electronic apparatus 201 may, for example, include a mobile TV support device (e.g., a GPU) for processing media data according to standards such as digital multimedia broadcasting (DMB), digital video broadcasting (DVB), mediaFlo™, etc. Each element described in the present specification may consist of one or more than one components, and the name of the components may vary depending on the type of electronic apparatuses. According to various embodiments, the electronic apparatus 201 may omit some constituent elements, may further include other additional constituent elements, or may be combined to form a single entity which performs the same functions as those elements before being combined.

Figure 2:
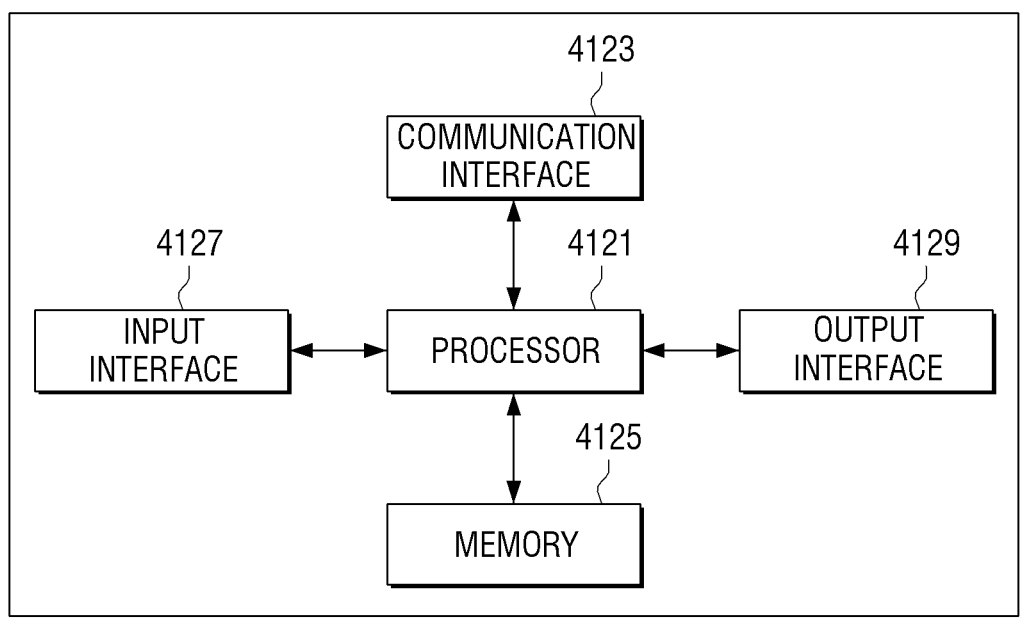
FIG. 2 is a block diagram of a device according to an embodiment of the disclosure.

FIG. 2 is a block diagram of a device according to an embodiment of the disclosure.

Referring to FIG. 2, a device 412 may include a processor 4121 (e.g., at least one processor), a communication interface 4123, a memory 4125, an input interface 4127 and an output interface 4129.

The processor 4121 may control the overall operations of the device 412. For example, the processor 4121 may control the communication interface 4123 and the memory 4125. The detailed description of the processor 4121 is the same as described above with reference to FIG. 1 and, therefore, further description will not be provided.

The communication interface 4123 may include a nearfield communication module (e.g., WiFi), and may communicate with an AP and an electronic apparatus via the nearfield communication module.

The memory 4125 may store AP identification information received via the communication interface 4123 and identification information of the electronic apparatus. The memory 4125 may store an instruction which, when the processor 4121 is executed, performs an operation of connecting with the electronic apparatus via the communication interface using a first data stored in the memory 4125, an operation of receiving identification information of an access point from the electronic apparatus, an operation of connecting with the access point using the identification information of the access point received from the electronic apparatus, an operation of connecting with a server via the access point, an operation of receiving second identification information of the electronic apparatus from the server and storing the received second identification information in the memory, and an operation of, when disconnected from the access point, connecting with the electronic apparatus using the second identification information. The first data may be stored in the memory 4125 of the device at the time of the manufacturing of the device. The first data may include identification information of the electronic apparatus. For example, the first data may include an SSID of the electronic apparatus.

The input interface 4127 may, for example, be a physical button, and the user may input a command to operate the device via the input interface. For example, the user may control the device to be operated in a communication setting mode via the input interface.

The output interface 4129 may provide information relating to an operation state of a device to a user through a visual, auditory, and/or tactile feedback.

Figure 3A:
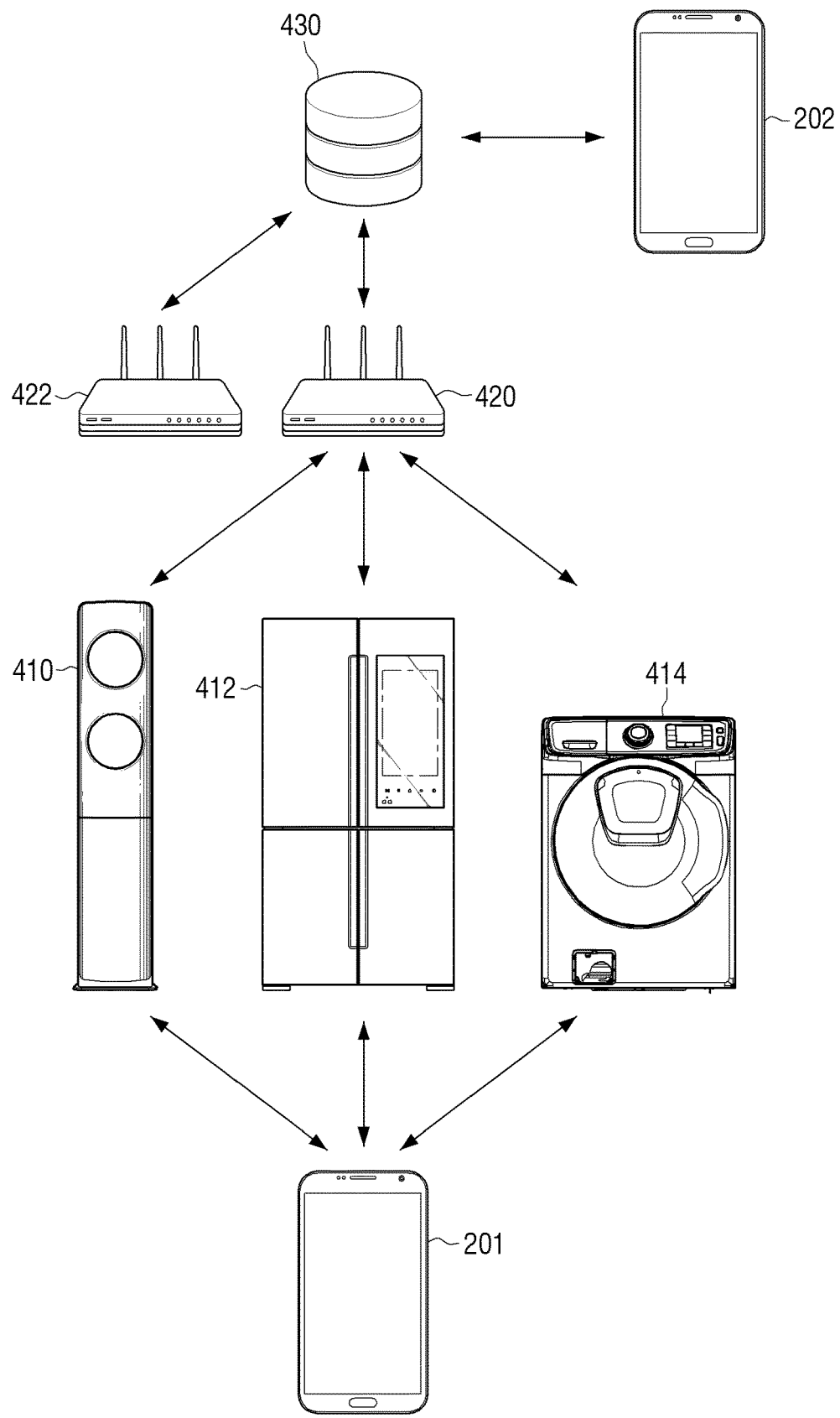
FIGS. 3A and 3B illustrate an example system configuration according to various embodiments of the disclosure.
Figure 3B:
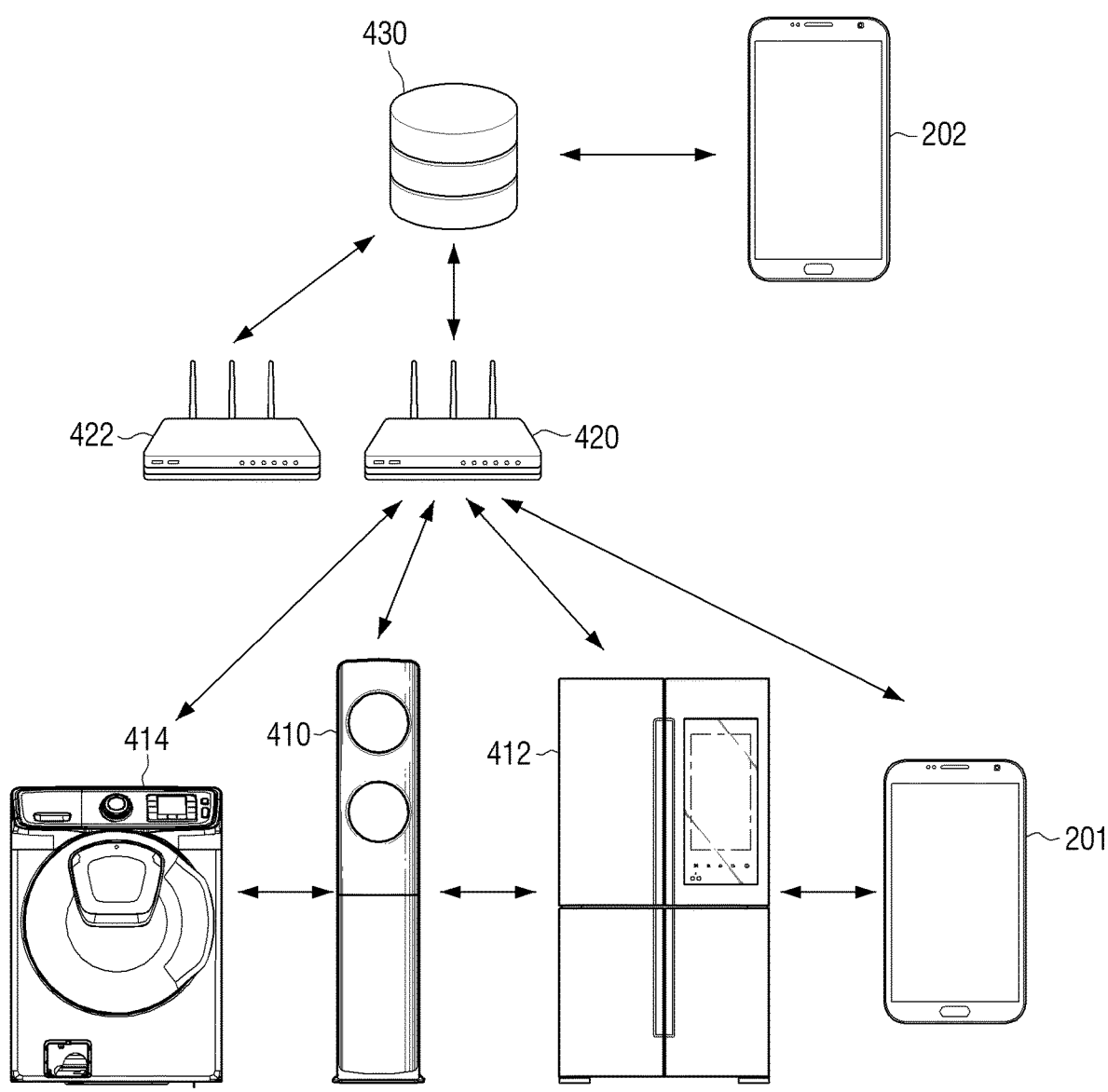

FIGS. 3A and 3B illustrate an example system configuration according to various embodiments of the disclosure.

Referring to FIG. 3A, a system may include an electronic apparatus 201, a second electronic apparatus 202, a first device 410, a second device 412, a third device 414, access points (AP) 420 and 422, and a server 430.

The electronic apparatus 201 may be an external electronic apparatus.

The electronic apparatus 201 may support communication setting of the first device 410, the second device 412, and the third device 414. For example, the electronic apparatus 201 may store identification information of the access point in a memory of the electronic apparatus 201, and broadcast identification information of the electronic apparatus 201. In addition, the first device 410 and the second device 412 may communicatively connect with the electronic apparatus 201 based on the identification information of the electronic apparatus 201. The electronic apparatus 201 may substantially simultaneously transmit the identification information of the access point to the first device 410 and the second device 412. The first device 410 and the second device 412 may communicatively connect with the access point using the identification information of the access point.

The first device 410 and the second device 412 may access the server via the access point, and the server may transmit second identification information of the electronic apparatus 201 to the first device 410, the second device 412, and the electronic apparatus 201. The first device 410 and the second device 412 may, when disconnected from the server, communicatively connect with the electronic apparatus 201 using the second identification information.

The electronic apparatus 201 may, for example, be a smartphone of a user, and may be connected to the APs 420 and 422 via the communication interface or may be directly connected to the server 430 via the communication interface. When the electronic apparatus 201 is connected with the APs 420 and 422, the electronic apparatus 201 may be connected with the server 430 via the APs 420 and 422.

The user may input identification information (e.g., an SSID) of an AP to be connected and a password to the electronic apparatus 201, and the electronic apparatus 201 may store the identification information of the AP and password inputted by the user in a memory.

For example, the user may input "KHOME" as an SSID and "1234" as a password to connect with the AP 420, and the electronic apparatus 201 may store the input "KHOME" and the input "1234" in the memory.

The first device 410, the second device 412, and the third device 414 may include a nearfield communication module such as WiFi. The first device 410, the second device 412, and the third device 414 may be connected to the access point 420, and may be connected with the server 430 via the AP 420.

The first device 410, the second device 412, and the third device 414 may be home appliances within households, and may, for example, be a micro wave oven (MWO), a refrigerator, a washing machine or an air conditioner. The first device 410, the second device 412, and the third device 414 may be connected with an electronic apparatus using a predetermined first data. The first data may, for example, include identification information (e.g., an SSID) of an electronic apparatus that is broadcasted while the electronic apparatus 201 is operated in an AP mode. In addition, the first data may include names of the first device 410, the second device 412 and the third device 414. The first data may be assigned by the manufacturer at the time of manufacturing the device and may be stored in a memory. In addition, if devices have the same manufacturer, the same first data may be assigned. For example, when the first device 410, the second device 412 and the third device 414 were manufactured by one manufacturer, first data of the first device 410, the second device 412 and the third device 414 may be the same.

Meanwhile, the first device 410, the second device 412 and the third device 414 may not include a display apparatus for displaying information. Accordingly, it may be difficult for the user to directly manipulate the first device 410, the second device 412 and the third device 414 to connect the devices with the AP 420.

To connect the first device 410, the second device 412, and the third device 414 with the AP 420, it is necessary that the device identifies identification information (e.g., an SSID) of the AP 420. In a case in which the first device 410, the second device 412 and the third device 414 are communicatively connected with the electronic apparatus 201, the first device 410, the second device 412, and the third device 414 may receive identification information of the AP 420 from the electronic apparatus 201.

In a case in which the user operates the electronic apparatus 201 in an AP mode, the electronic apparatus 201 may broadcast identification information of the electronic apparatus with a predetermined value for a predetermined time. In this case, the identification information of the electronic apparatus may be identical to the first data of the device stored in the device. Thus, in a case in which the electronic apparatus is operated in a soft AP mode and the first device 410, the second device 412, and the third device 414 are operated in a communication setting mode, the first device 410, the second device 412, and the third device 414 may be communicatively connected with the electronic apparatus 201 using the first data.

According to an embodiment, to operate the electronic apparatus 201 in an AP mode, the user may execute a communication setting application (e.g., app) in the electronic apparatus. The communication setting application may be provided by the device manufacturer or may be provided by a third party.

When the user executes a communication setting application in the electronic apparatus 201 is operated in the AP mode and the same identification information as the first data stored in the first device 410, the second device 412, and the third device 414 is broadcasted. According to an embodiment, a user account may be generated in the server 430 before the communication setting application is executed. In addition, the electronic apparatus 201 may store identification information of the communicatively-connected AP 420 in a memory.

The first device 410, the second device 412, and the third device 414 may receive identification information of the electronic apparatus 201 which is broadcasted by the electronic apparatus 201, and may send a connection request to the electronic apparatus 201 using the first data stored in the memory of the first device 410, the second device 412, and the third device 414. When the electronic apparatus 201 approves connection, the electronic apparatus 201 may be communicatively connected with the first device 410, the second device 412, and the third device 414. According to an embodiment, information (e.g., 'air conditioner', 'refrigerator', etc.) relating to a device connected to the electronic apparatus 201 may be displayed on a display.

In a state in which the first device 410, the second device 412, and the third device 414 are connected with the electronic apparatus 201, the electronic apparatus 201 may substantially simultaneously transmit the identification information of the AP 420 to the connected first device 410, the connected second device 412 and the connected third device 414 based on a user input. Herein, the term "collectively" may be interpreted to refer to "simultaneously" or "substantially simultaneously".

When the first device 410, the second device 412, and the third device 414 receive the identification information of the AP 420 from the electronic apparatus 201, the first device 410, the second device 412, and the third device 414 may be connected with the AP 420 using the identification information of the AP 420.

The AP 420 may be connected with the server 430. In a case in which the first device 410, the second device 412, and the third device 414 are connected with the AP 420, the first device 410, the second device 412, and the third device 414 may be connected with the server 430 via the AP 420.

The server 430 may be a server that manages a household device (e.g., home appliances and internet of things (IoT)). The server 430 may store identification information (e.g., Mac address, IP address, model name of the device, etc.) of the first device 410, second device 412 and third device 414 connected with the AP 420 and register the first device 410, the second device 412, and the third device 414.

Meanwhile, the server 430 may generate a user account and manage a plurality of devices within a household. So as to register a device in a user account, account information is required. The account information may include an ID and a password, and the electronic apparatus 201 may transmit the account information to the first device 410, the second device 412, and the third device 414.

The server 430 may, when connected with the first device 410, the second device 412, and the third device 414, register the first device 410, the second device 412, and the third device 414 in a user account of the server 430 through the account information. The server may transmit, to the electronic apparatus 201, information indicating that the first device 410, the second device 412, and the third device 414 are connected.

When the first device 410, the second device 412, and the third device 414 are registered with the server 430, the user may control the first device 410, the second device 412, and the third device 414 through the electronic apparatus 201. For example, when the first device 410 (e.g., an air conditioner 410) is connected with the server 430, the server 430 may manage the temperature and operation time of the air conditioner. For example, the server may generate a user account and manage a plurality of devices within a household. The user may access a user account of the server 430 through the electronic apparatus 201 and control the air conditioner 410 registered with the user account.

An account of the second electronic apparatus 202 may be interlocked with the user or may be shared with the user. The second electronic apparatus 202 may, for example, be an electronic apparatus of a family member.

When the second electronic apparatus 202 shares a user account of the electronic apparatus 201 or is interlocked with the user account, the second electronic apparatus 202 may control the first device 410, the second device 412, and the third device 414 without an additional device registration process.

In addition, the second electronic apparatus 202 may copy device information stored in the user account onto an account of the user of the electronic apparatus 202.

Meanwhile, in a case in which a third device, which is not present in the user account (hereinafter referred to as "first user account") using the first electronic apparatus 201, is registered with the user account (hereinafter referred to as "second user account") using the second electronic apparatus 202, the first electronic apparatus 201 may update the account information by adding registration information relating to the third device to the first user account through account linkage.

Meanwhile, when the AP 420 connected with the server 430 is replaced with the AP 422, the first device 410, the second device 412, and the third device 414 may be disconnected from the server 430.

When disconnected from the server 430, the first device 410, the second device 412, and the third device 414 may be connected with the electronic apparatus 201 by using a predetermined first data.

The electronic apparatus 201 may store identification information of the new AP 422 in a memory, when the first device 410, the second device 412, and the third device 414 and the electronic apparatus 201 are connected again, transmit the identification information of the new AP 422 to the first device 410, the second device 412, and the third device 414. The first device 410, the second device 412, and the third device 414 may be connected to the AP 422 by using the identification information of the AP 422 and may be connected with the server 430 again.

According to an embodiment, when the first device 410, the second device 412, and the third device 414 are registered with the server 430, the server 430 may transmit new identification information to the connected first device 410, the connected second device 412, the connected third device 414, and the electronic apparatus 201. The new identification information transmitted to the devices 410, 412 and 414 may be different from identification information initially assigned at the time of manufacturing the device. For example, in the identification information initially assigned at the time of the manufacturing of the device, an SSID may be "SamsungHome" and a password may be "1234". In the identification information newly assigned by the server 430, an SSID may be "SamsungHome_01" and a password may be "5678".

The first device 410, the second device 412, the third device 414, and the electronic apparatus 201 may store new identification information (hereinafter referred to as "second identification information" assigned by the server in a memory. When the first device 410, the second device 412, and the third device 414 are disconnected from the server 430 and a communication setting operation is performed again, the first device 410, the second device 412, the third device 414, and the electronic apparatus 201 may communicatively connect with the electronic apparatus 201 by using the second identification information. As the electronic apparatus 201, the first device 410, the second device 412, and the third device 414 perform a communication setting operation as described above, the error that another device is erroneously registered with a user account because the same identification information is used by another user.

Meanwhile, the first device 410, the second device 412, and the third device 414 may be connected with the electronic apparatus 201 by using the first data initially assigned at the time of the manufacturing of the device based on the user input. For example, in a case in which the user presses a particular button (e.g., an "easy setup" button) included in the devices 410, 412 and 414, the first device 410, the second device 412, and the third device 414 may attempt to connect with the electronic apparatus 201 by using the initially-assigned first data. The first data may include identification information of the electronic apparatus 201. In addition, the electronic apparatus 201 may initially-assigned identification information according to a user input.

Meanwhile, in a case in which some of household devices are far-distanced from the electronic apparatus 201 and cannot be connected with the electronic apparatus 201, AP identification information may be received using a mesh communication between devices.

FIG. 3B illustrates an electronic apparatus 201, a second electronic apparatus 202, a first device 410, a second device 412, a third device 414, access points (AP) 420 and 422, and a server 430.

For example, the second device 412 and the electronic apparatus 201 may be directly connected via communication. The devices 410 and 414 are distanced far away from the electronic apparatus 201 and thus cannot be directly connected via communication. In this case, the second device 412 receives identification information of the AP 420 from the electronic apparatus 201, and the first device 410 transmits the identification information of the AP 420 back to the third device 414.

The devices 410 and 414 may store the received identification information of the AP 420, and be connected to the AP 420 using the identification information of the AP 420.

Figure 4:
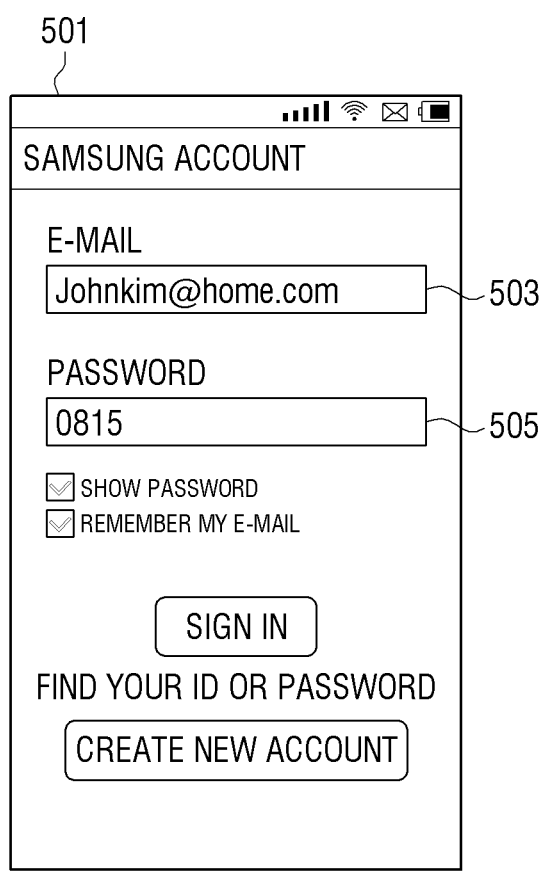
FIG. 4 illustrates an example user interface (UI) screen in which an electronic apparatus accesses a user account of a server according to an embodiment of the disclosure.

FIG. 4 illustrates an example user interface (UI) screen in which an electronic apparatus accesses a user account of a server according to an embodiment of the disclosure.

FIGS. 3A and 4 illustrate an account ID 503 and password 505 which are input by the user on the screen 501 of the electronic apparatus 201.

When the electronic apparatus 201 executes a communication setting app, the server 430 may display a UI requesting an account information input on the screen 501. For example, a UI requesting input of the account ID 503 and the password may be displayed on the screen 501.

When the user inputs the account ID 503 and the password 505, the user may access a user account of the server 430. The account ID 503 may, for example, be an email address of the user.

When the user inputs the account ID 503 and the password 505 and an authentication is complete, the user may control a device registered with the user account through the electronic apparatus 201.

Figure 5:
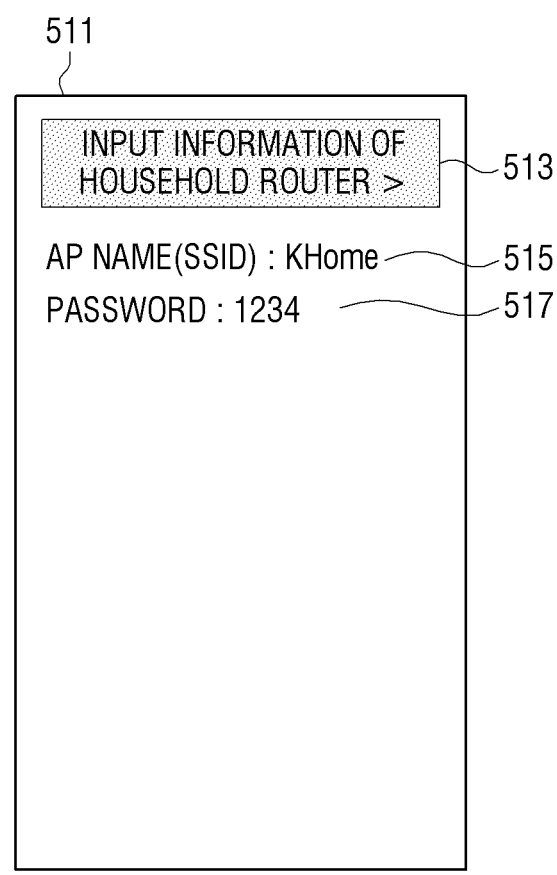
FIG. 5 illustrates an example UI screen in which an electronic apparatus is connected with an access point (AP) according to an embodiment of the disclosure.

FIG. 5 illustrates an example UI screen in which an electronic apparatus is connected with an AP according to an embodiment of the disclosure.

Referring to FIG. 5, an AP identification information input button 513 and AP identification information 515 and 517 inputted by a user are displayed on the screen 511.

The AP identification information may, for example, include an SSID 515 and/or password 517 of the AP.

When the user attempts to connect with the AP, a UI requesting input of the SSID 515 and password 517 of the AP may be displayed on the screen 511. When the user inputs the SSID 515 and the password 517, the AP authenticates an electronic apparatus based on the inputted SSID 515 and the inputted password, and the electronic apparatus may be connected with the server via the AP.

The inputted SSID 515 and password 517 of the AP may be stored in a memory of the electronic apparatus. When the device is communicatively connected with the electronic apparatus, an SSID and password of an AP stored in the memory may be transmitted to a device connected with the electronic apparatus. In a case in which a plurality of devices is connected with the electronic apparatus, the electronic apparatus may substantially simultaneously transmit the SSID and password of the AP to the plurality of devices.

According to an embodiment, it is possible to display a list of connectible APs on the screen without the need for the user to directly input the SSID, and the user may input the SSID by selecting one of the APs in the list and store the selected one in a memory.

Figure 6:
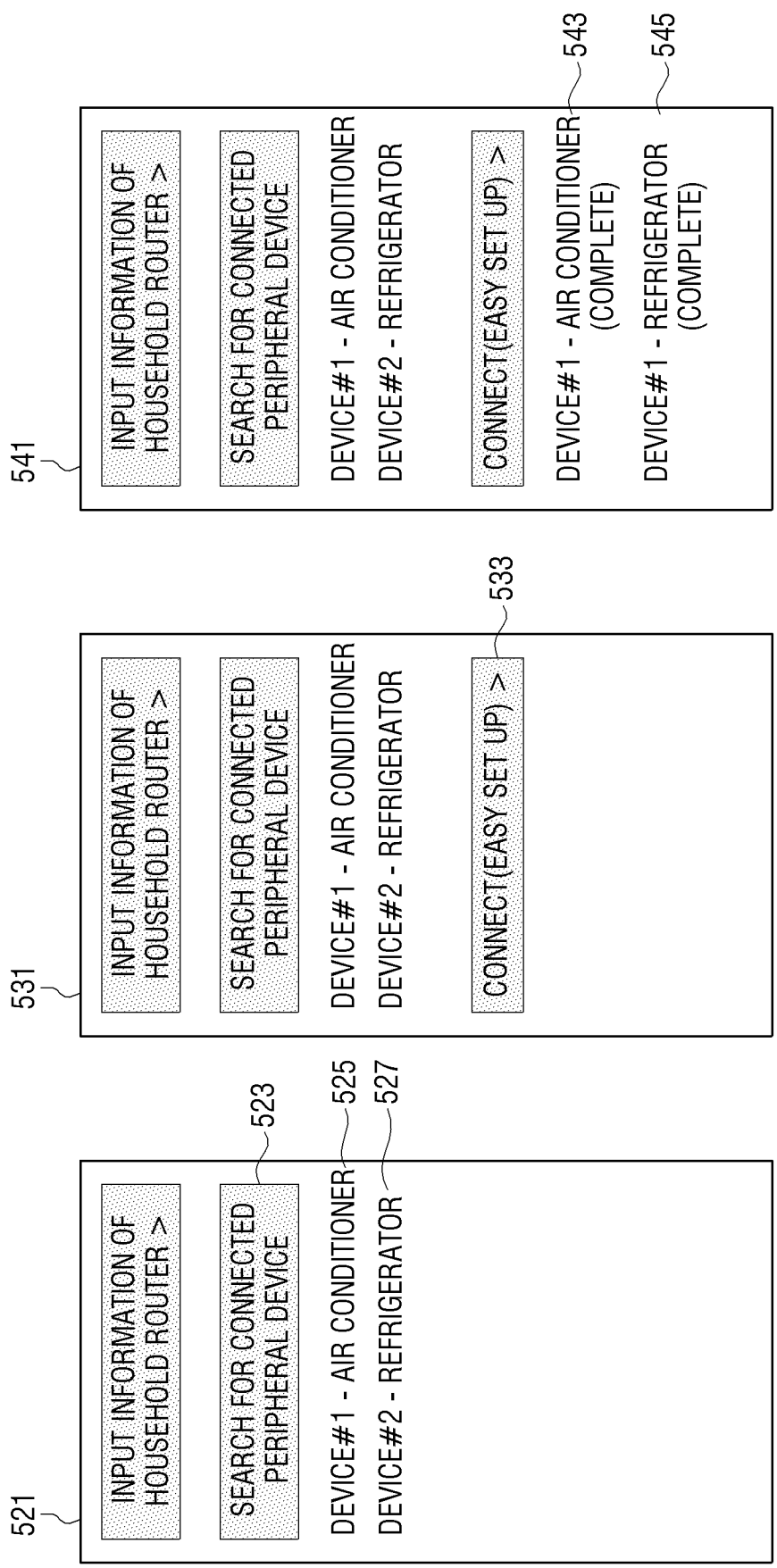
FIGS. 6A, 6B, and 6C illustrate an example UI which collectively performs a communication setting with respect to a plurality of household devices by using an electronic apparatus according to various embodiments of the disclosure.

FIGS. 6A, 6B, and 6C illustrate an example UI which collectively performs a communication setting with respect to a plurality of household devices by using an electronic apparatus according to various embodiments of the disclosure.

Referring to FIG. 6A, when the user executes a communication setting app, the electronic apparatus may access an account of a server and a button 523 may be displayed on the screen 521. When the user selects the button 523, a list of devices 525, 527 connected to the electronic apparatus may be displayed on the screen.

Referring to FIG. 6B, in a state in which a list of currently-connected devices is displayed on the screen 531, when the user selects the button 533, the electronic apparatus may transmit AP identification information to a device displayed on the list.

Referring to FIG. 6C, a device may be connected with the AP by using the AP identification information received from the electronic apparatus. The server may register the connected device with a user account, and when the registration is complete, display messages 543 and 545 informing that the registration is complete on the screen 541.

Figure 7:
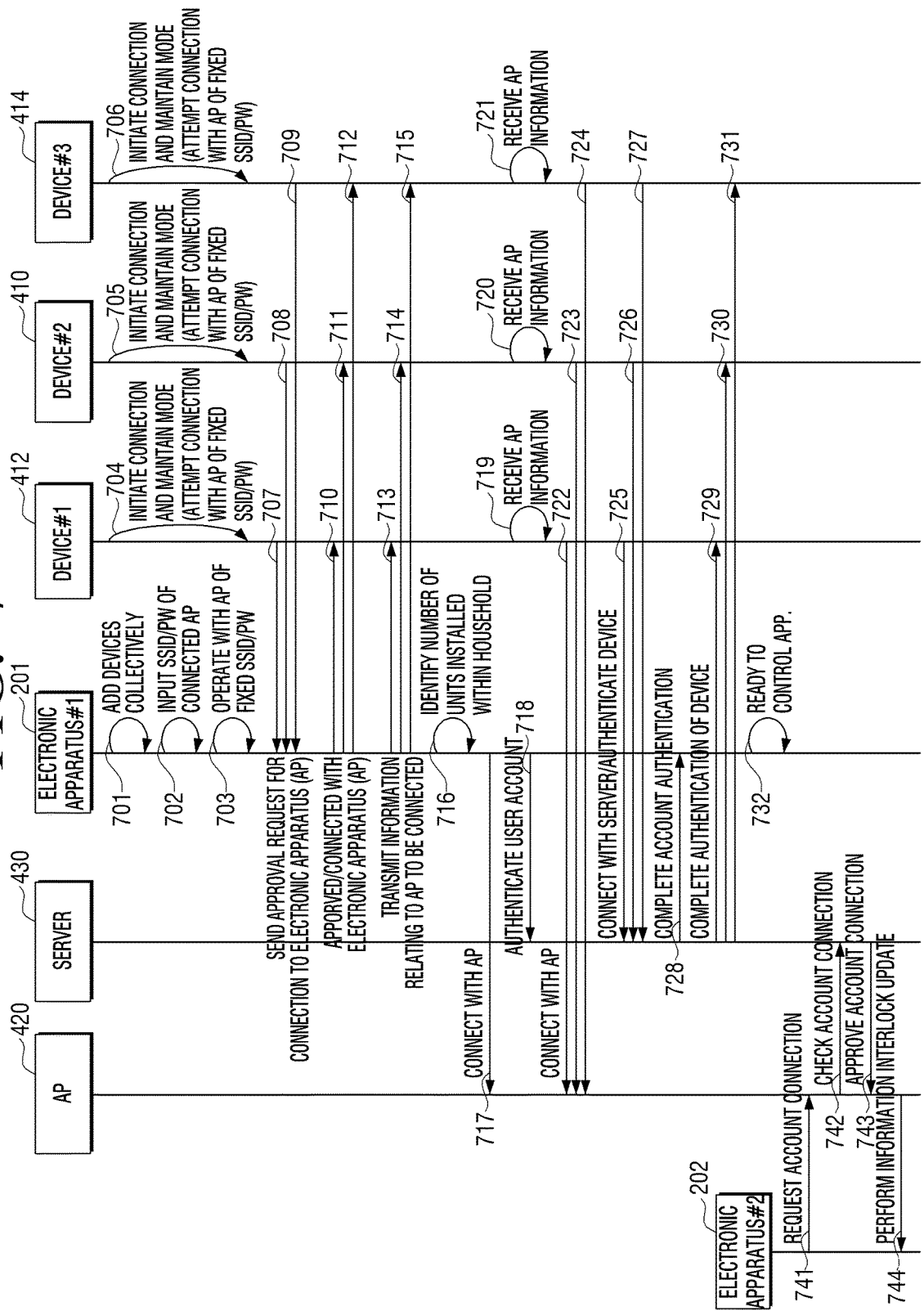
FIG. 7 illustrates an example of a process of collectively performing a communication setting with respect to a plurality of household devices through an electronic apparatus according to an embodiment of the disclosure.

FIG. 7 illustrates an example of a process of collectively performing a communication setting with respect to a plurality of household devices through an electronic apparatus according to an embodiment of the disclosure.

FIG. 7 illustrates an AP 420, a server 430, an electronic apparatus #1 201, a device #1 412, a device #2 410, a device #3 414, and an electronic apparatus #2 202.

The device #1 412 is a first device. The device #2 410 is a second device. The device #3 414 is a third device. The electronic apparatus #1 201 is an external electronic apparatus.

For convenience of explanation, it will be assumed that an SSID of the AP 420 for connecting with the AP 420 is "KHome" and that a password is "1234". It will be assumed that the first data assigned by the manufacturer at the time of the manufacturing of the devices 410, 412 and 414, for example, the SSID, is "SamsungHome" and that the password is "1234". It will be assumed that when the electronic apparatus #1 201 is operated in an AP mode, the SSID of the electronic apparatus #1 201 is "SamsungHome", and that the password is "1234".

At operation 701, when the user executes a communication setting application in the electronic apparatus and inputs a collective device addition command, at operation 702, the electronic apparatus inputs an SSID and password of the AP 420 to be connected. For example, the user inputs "KHome" as the SSID and "1234" as the password, and the electronic apparatus #1 201 stores the input "KHome" and the input password "1234" in a memory.

The electronic apparatus 201 is operated for a predetermined time with the SSID "SamsungHome" and the password "1234", at operation 703. For example, the electronic apparatus #1 201 broadcasts "SamsungHome".

The device #1 412 makes a connection attempt to the electronic apparatus #1 201 using the SSID and password (e.g., "SamsungHome" and "1234") assigned at the time of manufacturing while the device #1 412 is operated in a connection start mode, at operation 704. The device #1 412 sends an approval request for connection to the electronic apparatus #1 201, at operation 707. At operation 710, the electronic apparatus #1 201 approves the device #1 412 and the device #1 412 is connected with the electronic apparatus #1 201.

The device #2 410 makes a connection attempt to the electronic apparatus #1 201 using the SSID and password (e.g., "SamsungHome" and "1234") assigned at the time of manufacturing while the device #1 412 is operated in a connection start mode, at operation 705. The device #2 410 sends an approval request for connection to the electronic apparatus #1 201, at operation 708. At operation 711, the electronic apparatus #1 201 approves the device #2 410 and the device #2 410 is connected with the electronic apparatus #1 201.

The device #3 414 makes a connection attempt to the electronic apparatus #1 201 using the SSID and password (e.g., "SamsungHome" and "1234") assigned at the time of manufacturing while the device #1 412 is operated in a connection start mode, at operation 706. The device #3 414 sends an approval request for connection to the electronic apparatus #1 201, at operation 709. At operation 712, the electronic apparatus #1 201 approves the device #3 414 and the device #3 414 is connected with the electronic apparatus #1 201.

The electronic apparatus #1 201, after being connected with the device #1 412, the device #2 410, and the device #3 414, substantially simultaneously transmits identification information of the AP 420 to the device #1 412, the device #2 410, and the device #3 414.

That is, at operations 713, 714 and 715, the electronic apparatus #1 201 may substantially simultaneously transmit identification (e.g., "KHome" as an SSID and "1234" as a password) of the AP 420 to be connected to the device #1 412, the device #2 410, and the device #3 414.

The electronic apparatus identifies the number of the device #1 412, the device #2 410 and the device #3 414 installed within household and then converts an operation to a station mode at operation 716, connects with the AP 420 at operation 717, sends an authentication request using an account ID and a password to the server 430 to access the user account of the server 430 via the AP 420 and accesses the user account at operation 718. Meanwhile, the electronic apparatus may register information relating to household devices connected to itself in the user account while the electronic apparatus accesses the user account.

The device #1 412 may be connected with the AP 420 using the received SSID and password of the AP 420, at operations 719 and 722, and is connected with the server 430 via the AP 420 and sends an authentication request of the device #1 412, at operation 725.

The device #2 410 may be connected with the AP 420 using the received SSID and password of the AP 420, at operations 720 and 723, and is connected with the server 430 via the AP 420 and sends an authentication request of the device #2 410, at operation 726.

The device #3 414 may be connected with the AP 420 using the received SSID and password of the AP 420, at operations 721 and 724, and is connected with the server 430 via the AP 420 and sends an authentication request of the device #3 414, at operation 727.

The server 430 completes authentication of the electronic apparatus #1 201, at operation 728.

The server 430 completes authentication of the device #1 412 and registers the device #1 412 in the user account, at operation 729.

The server 430 completes authentication of the device #2 410 and registers the device #2 410 in the user account, at operation 730.

The server 430 completes authentication of the device #3 414 and registers the device #3 414 in the user account, at operation 731.

The electronic apparatus #1 201 may complete the preparation for controlling the devices 412, 410 and 414 registered in the server 430 and wait for a user command, at operation 732.

Meanwhile, the second electronic apparatus 202 may be connected with the server 430 and requests the server 430 to connect with the user account, at operation 741. The server 430 may request the electronic apparatus #1 201 to check account connection with respect to the electronic apparatus #2 202, at operation 742. When the electronic apparatus #1 201 approves the account connection with respect to the electronic apparatus #2 202, at operation 743, the server 430 may proceed with the information interlock update of the device #1 412, the device #2 410 and the device #3 414 with respect to the electronic apparatus #2 202, at operation 744.

Figure 8:
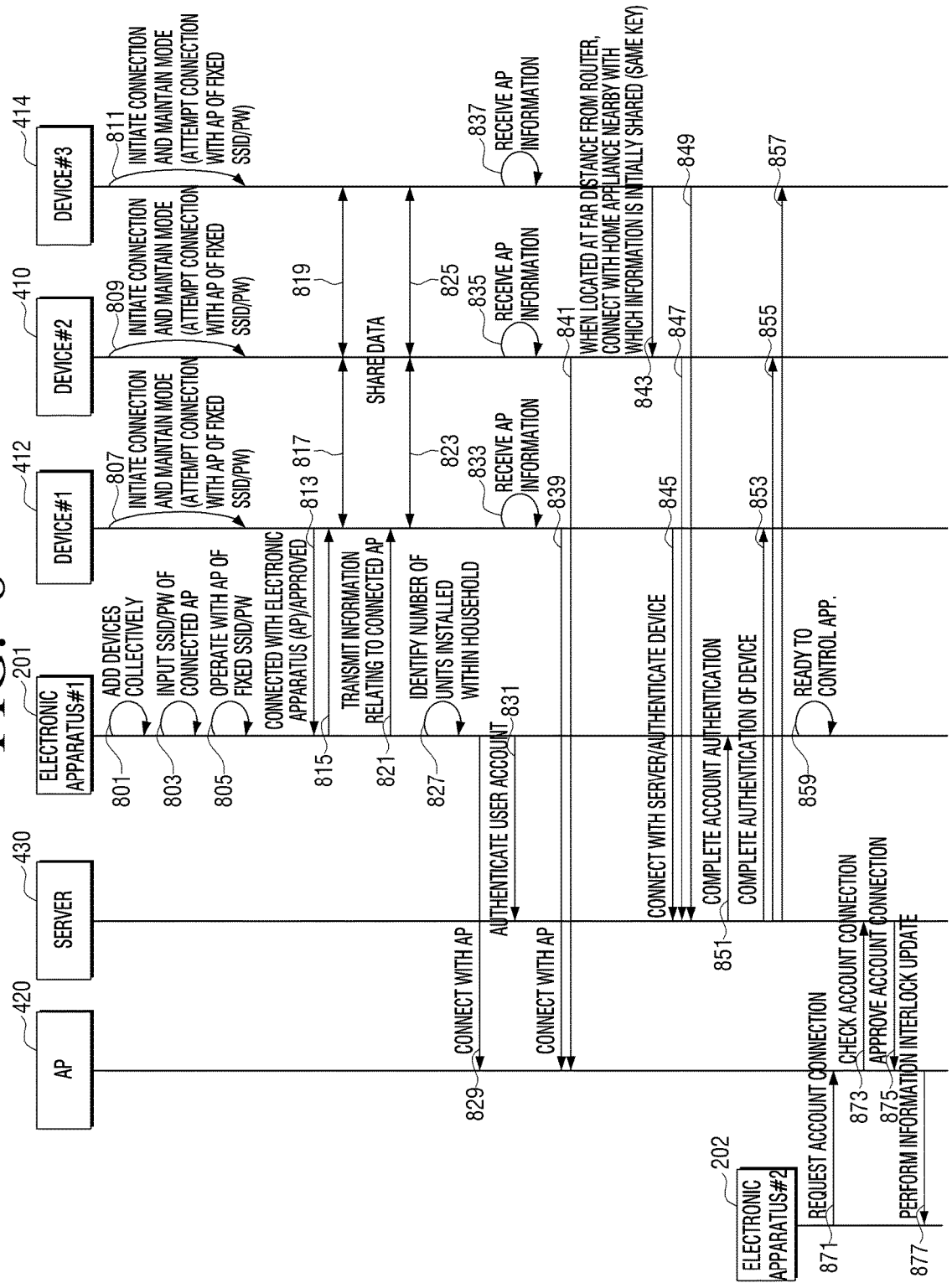
FIG. 8 illustrates another example of a process of collectively performing a communication setting with respect to a plurality of household devices through an electronic apparatus according to an embodiment of the disclosure.

FIG. 8 illustrates another example of a process of collectively performing a communication setting with respect to a plurality of household devices by using a mesh technology in an electronic apparatus according to an embodiment of the disclosure.

FIG. 8 illustrates an AP 420, a server 430, an electronic apparatus #1 201, a device #1 412, a device #2 410, a device #3 414, and an electronic apparatus #2 202.

The device #1 412 is a first device. The device #2 410 is a second device. The device #3 414 is a third device. The electronic apparatus #1 201 is an external electronic apparatus.

The device #1 412, the device #2 410 and the device #3 414 may transmit or receive data using the mesh technology. Mesh technology is a technology that expands the coverage by communication between each device in case the home is wide and some devices cannot connect to the home router.

For example, the device #1 412 and the device #2 410 are communicatively connected with each other, and the device #1 412 and the device #2 410 may transmit or receive data to/from each other. The device #2 410 and the device #3 414 are communicatively connected with each other, and the device #2 410 and the device #3 414 may transmit or receive data to/from each other.

For convenience of explanation, it will be assumed that the electronic apparatus #1 201 and the device #1 412 may communicate with each other, but that the device #2 410 and the device #3 414 are distanced far away and cannot directly communicate with each other. In addition, it will be assumed that the device #1 412 and the device #2 410 may communicate with the AP 420, but that the device #3 414 is distanced far away from the AP 420 and cannot directly communicate with the AP 420.

For convenience of explanation, it will be assumed that an SSID of the AP 420 for connecting with the AP 420 is "KHome" and that a password is "1234". It will be assumed that the first data assigned by the manufacturer at the time of the manufacturing of the devices 410, 412 and 414, for example, the SSID, is "SamsungHome" and that the password is "1234". It will be assumed that when the electronic apparatus #1 201 is operated in an AP mode, the SSID of the electronic apparatus #1 201 is "SamsungHome", and that the password is "1234".

At operation 801, when the user executes a communication setting application in the electronic apparatus and inputs a collective device addition command, at operation 803, the electronic apparatus inputs an SSID and password of the AP 420 to be connected. For example, the user inputs "KHome" as the SSID and "1234" as the password, and the electronic apparatus #1 201 stores the input "KHome" and the input password "1234" in a memory.

The electronic apparatus 201 is operated for a predetermined time with the SSID "SamsungHome" and the password "1234", at operation 805. For example, the electronic apparatus #1 201 broadcasts "SamsungHome".

The device #1 412 makes a connection attempt to the electronic apparatus #1 201 using the SSID and password (e.g., "SamsungHome" and "1234") assigned at the time of manufacturing while the device #1 412 is operated in a connection start mode, at operation 807.

The device #2 410 makes a connection attempt to the electronic apparatus #1 201 using the SSID and password (e.g., "SamsungHome" and "1234") assigned at the time of manufacturing while the device #1 412 is operated in a connection start mode, at operation 809.

The device #3 414 makes a connection attempt to the electronic apparatus #1 201 using the SSID and password (e.g., "SamsungHome" and "1234") assigned at the time of manufacturing while the device #1 412 is operated in a connection start mode, at operation 811.

The device #1 412 sends an approval request for connection to the electronic apparatus #1 201, at operation 815. At operation 813, the electronic apparatus #1 201 approves the device #1 412 and the device #1 412 is connected with the electronic apparatus #1 201. When the device #1 402 is communicatively connected with the electronic apparatus #1 201, the electronic apparatus #1 201 transmits an SSID and password of the AP 420 to the device #1 412, at operation 821.

Meanwhile, the device #2 410 is at a far distance from the electronic apparatus #1 201 and is in a state where it is difficult to directly receive data from the electronic apparatus #1 201, at operation 809, and receives an SSID and password of the electronic apparatus #1 201 through the device #1 412, at operation 817.

The device #3 414 is at a far distance from the electronic apparatus #1 201 and is in a state where it is difficult to directly receive data from the electronic apparatus #1201, at operation 819, and receives an SSID and password of the electronic apparatus #1 201 through the device #1 412 and the device #2 410, at operation 819.

The device #2 410 may receive data (e.g., an SSID and password of the AP 420) for connecting with the AP 420 from the device #1 412 by using a mesh technology, at operation 823.

Likewise, the device #3 414 may also receive data for connecting with the AP 420 from the device #2 410 by using the mesh technology, at operation 825.

The electronic apparatus #1 201 identifies the number of the device #1 412, the device #2 410 and the device #3 414 installed within household and then converts an operation to a station mode at operation 827, connects with the AP 420 at operation 829, sends an authentication request using an account ID and a password to the server 430 to access the user account of the server 430 via the AP 420 and accesses the user account at operation 831.

Meanwhile, the electronic apparatus may register information relating to household devices connected to itself in the user account while the electronic apparatus accesses the user account.

The device #1 412 may be connected with the AP 420 using the SSID and password of the AP 420 received from the electronic apparatus, at operations 833 and 839, and is connected with the server 430 via the AP 420 and sends an authentication request of the device #1 412, at operation 845.

The device #2 410 may be connected with the AP 420 using the SSID and password of the AP 420, at operations 835 and 841, and is connected with the server 430 via the AP 420 and sends an authentication request of the device #2 410, at operation 847.

Meanwhile, the device #3 414 may be connected with the AP 420 using the SSID and password of the AP 420, at operation 837. In a case in which it is at a far distance and it is difficult to be directly connected with the AP 420, the device #3 414 is connected with the device #2 410 adjacent to the AP 420 and sharing the information, connects with the server 430 through the device #2 410, sends an authentication request of the device #3 414, at operation 849. At operation 843, the device #3 414, when located at far distance from the home router, connects with a nearby home appliance (e.g., device #2 410) with which information is initially shared (same key).

The server 430 completes account authentication of the electronic apparatus #1 201, at operation 851.

The server 430 completes authentication of the device #1 412 and registers the device #1 412 in the user account, at operation 853.

The server 430 completes authentication of the device #2 410 and registers the device #2 410 in the user account, at operation 855.

The server 430 completes authentication of the device #3 414 and registers the device #3 414 in the user account, at operation 857.

The electronic apparatus #1 201 may complete the preparation for controlling the devices 412, 410 and 414 registered in the server 430 and wait for a user command, at operation 859.

Meanwhile, the electronic apparatus #2 202 may be connected with the server 430 and requests the server 430 to connect with the user account, at operation 871. The server 430 may request the electronic apparatus #1 201 to check account connection with respect to the electronic apparatus #2 202, at operation 873. When the electronic apparatus #1 201 approves the account connection with respect to the electronic apparatus #2 202, at operation 875, the server 430 may proceed with the information interlock update of the device #1 412, the device #2 410 and the device #3 414 with respect to the electronic apparatus #2 202, at operation 877.

Figure 9:
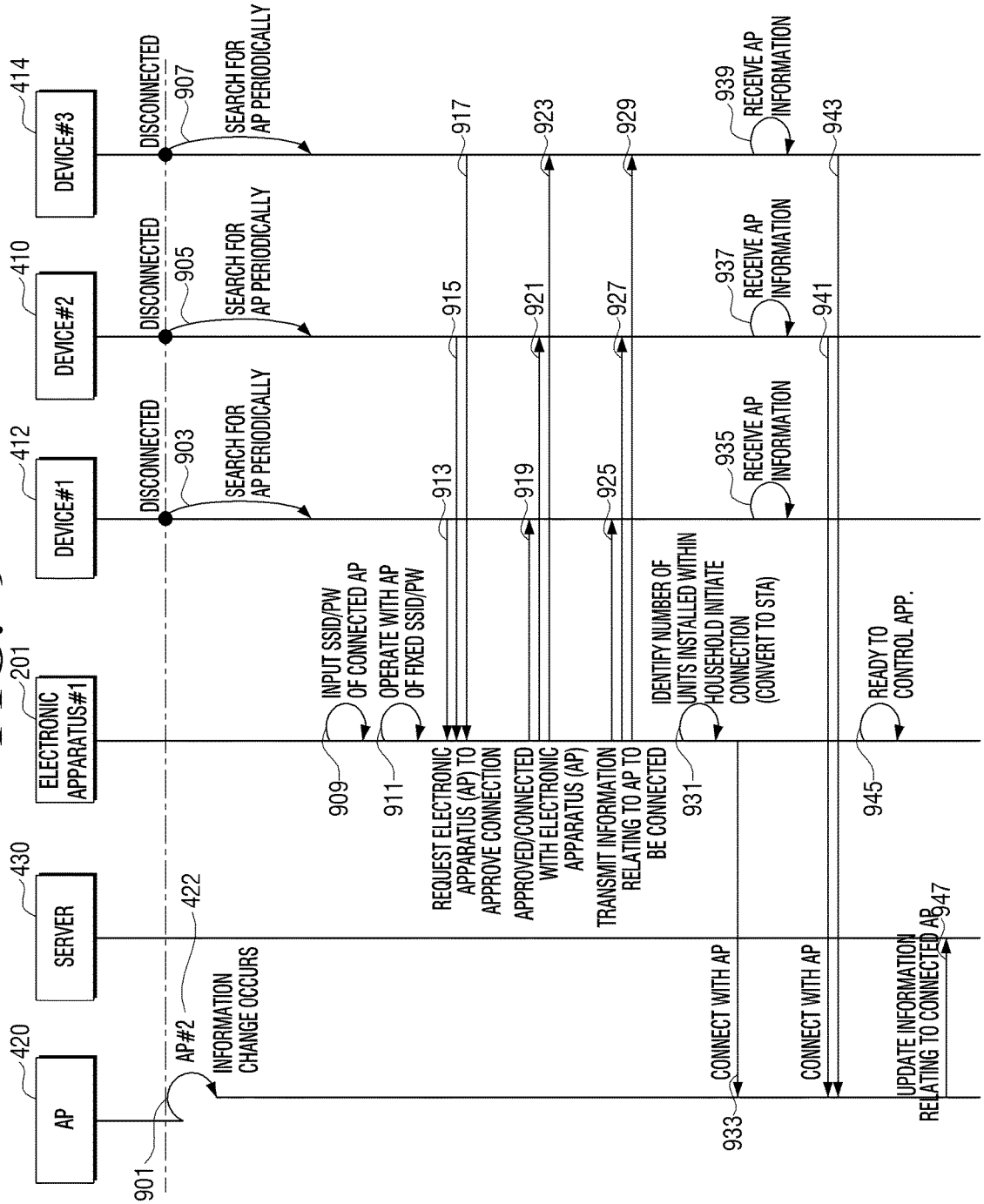
FIG. 9 illustrates an example in which an electronic apparatus performs a communication setting process again with respect to a plurality of household devices as an AP is replaced according to an embodiment of the disclosure.

FIG. 9 illustrates an example in which an electronic apparatus performs a communication setting process again with respect to a plurality of household devices as an AP is replaced according to an embodiment of the disclosure.

FIG. 9 illustrates an AP 420, an AP 422, an electronic apparatus 201, a device #1 412, a device #2 410, a device #3 414. The device #1 412 is a first device. The device #2 410 is a second device. The device #3 414 is a third device. The electronic apparatus #1 201 is an external electronic apparatus.

For convenience of explanation, it will be assumed that an SSID of the AP 420 for connecting with the AP 420 is "KHome" and that a password is "1234".

It will be assumed that an SSID of the AP 422 for connecting with the AP 422 is "KHome2" and that a password is "2345".

It will be assumed that the first data assigned by the manufacturer at the time of the manufacturing of the devices 410, 412 and 414, for example, the SSID, is "SamsungHome" and that the password is "1234". It will be assumed that when the electronic apparatus #1 201 is operated in an AP mode, the SSID of the electronic apparatus #1 201 is "SamsungHome", and that the password is "1234".

It will be assumed that initially, the device #1 412, the device #2 410, and the device #3 414 are connected with the AP 420, but that the AP 420 is replaced with the AP 422 and thus that the device #1 412, the device #2 410, and the device #3 414 are disconnected with the AP 420.

At operation 901, as the AP 420 is replaced with the AP 422, identification of an AP is changed.

As the device #1 412 is disconnected from the AP 420, the device #1 412 periodically searches for an AP, at operation 903.

As the device #2 410 is disconnected from the AP 420, the device #1 412 periodically searches for an AP, at operation 905.

As the device #3 414 is disconnected from the AP 420, the device #1 412 periodically searches for an AP, at operation 907.

The electronic apparatus #1 201 receives an SSID and password of the AP 422 to be newly connected, at operation 909. For example, the user inputs "KHome2" as the SSID and "2345" as the password, and the electronic apparatus #1 201 stores the input "KHome2" and the input password "2345" in a memory.

The electronic apparatus 201 is operated for a predetermined time with the SSID "SamsungHome" and the password "1234", at operation 911. For example, the electronic apparatus #1 201 broadcasts "SamsungHome".

The device #1 412 sends an authentication request for connection to the electronic apparatus #1 201 using the SSID and password (e.g., "SamsungHome" and "1234") assigned at the time of manufacturing, at operation 913. At operation 919, the electronic apparatus #1 201 approves the device #1 412 and the device #1 412 is connected with the electronic apparatus #1 201.

The device #2 410 sends an authentication request for connection to the electronic apparatus #1 201 using the SSID and password (e.g., "SamsungHome" and "1234") assigned at the time of manufacturing, at operation 915. At operation 921, the electronic apparatus #1 201 approves the device #2 410 and the device #2 410 is connected with the electronic apparatus #1 201.

The device #3 414 makes a connection attempt to the electronic apparatus #1 201 using the SSID and password (e.g., "SamsungHome" and "1234") assigned at the time of manufacturing while the device #1 412 is operated in a connection start mode, at operation 917. At operation 923, the electronic apparatus #1 201 approves the device #3 414 and the device #3 414 is connected with the electronic apparatus #1 201.

The electronic apparatus #1 201, after being connected with the device #1 412, the device #2 410, and the device #3 414, substantially simultaneously transmits identification information of the AP 422 to the device #1 412, the device #2 410, and the device #3 414.

That is, at operations 925, 927 and 929, the electronic apparatus #1 201 may substantially simultaneously transmit identification (e.g., "KHome2" as an SSID and "1234" as a password) of the APA 422 to be connected to the device #1 412, the device #2 410, and the device #3 414.

The electronic apparatus identifies the number of device #1 412, device #2 410 and device #3 414 installed within household at operation 931, then convert an operation mode to a station mode, and is connected with the AP 422, at operation 933.

The device #1 412 is connected with the AP 422 by using an SSID and password of the AP 422, at operations 935 and 941.

The device #2 410 is connected with the AP 422 by using an SSID and password of the AP 422, at operations 937 and 943.

The device #3 414 is connected with the AP 420 by using an SSID and password of the AP 422 as well, at operation 939.

The electronic apparatus #1 201 may complete the preparation for controlling the devices 412, 410 and 414 registered in the server 430 and wait for a user command, at operation 945.

The server 430 completes authentication of the device #1 412, the device #2 410 and the device #3 414, registers the device #1 412, the device #2 410 and the device #3 414 in the user account, and at operation 947, update information relating to the connected AP 422.

Figure 10:
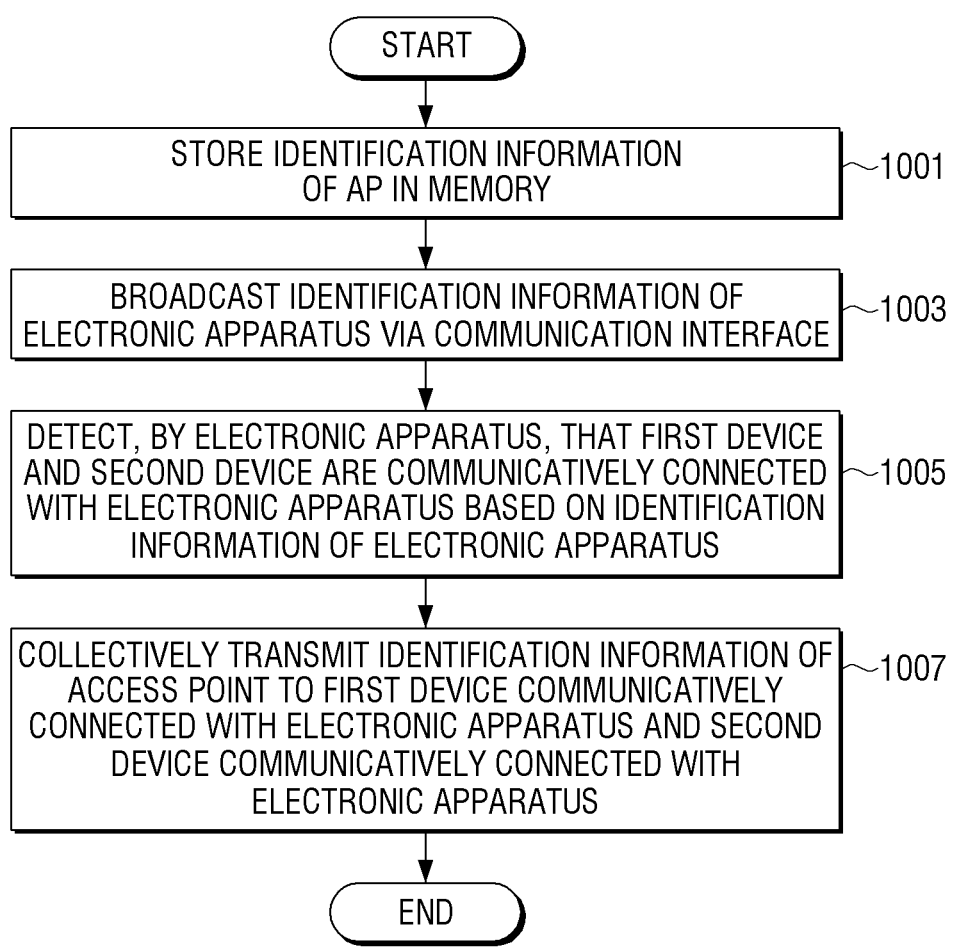
FIG. 10 illustrates a flowchart of a method of collectively performing a communication setting with respect to a plurality of household devices through an electronic apparatus according to an embodiment of the disclosure.

FIG. 10 illustrates a flowchart of a method of collectively performing a communication setting with respect to a plurality of household devices through an electronic apparatus according to an embodiment of the disclosure.

Referring to FIG. 10, the electronic apparatus stores identification information of the access point in a memory, at operation 1001. The identification information of the access point may, for example, include a service set identifier (SSID) of the access point. The user may input an SSID and/or password of the access point to connect with the access point, and the electronic apparatus may store the input SSID and/or the input password in the memory.

The electronic apparatus broadcasts predetermined identification information of the electronic apparatus via a communication interface, operation 1003. The identification information of the electronic apparatus is to identify the electronic apparatus when the electronic apparatus is operated in an AP mode, and may, for example, include an SSID. That is, the electronic apparatus broadcasts its own SSID via a communication interface. When the user executes a communication setting application in the electronic apparatus, predetermined identification information (e.g., an SSID) provided by the manufacturer of the device (e.g., a factory setting) may be broadcasted. In addition, the SSID of the electronic apparatus may be identical to the first data stored in the device. The device located near the electronic apparatus receives an SSID broadcasted by the electronic apparatus and identifies the electronic apparatus, communicatively connects with the electronic apparatus by using the first data stored in the memory, and requests authentication of the connection via communication. For example, since the SSID broadcasted by the electronic apparatus is identical to the first data stored in the device, the device may transmit its own identification information (e.g., product name or model name) to the electronic apparatus and request authentication. In this process, the electronic apparatus may request a device for a password, and the device may transmit a password included in the first data to the electronic apparatus. In addition, the electronic apparatus may receive the password and approves communicative connection of the device. Once the approval is complete, the device may be communicatively connected with the electronic apparatus.

The electronic apparatus may detect that one or more device is connected with the electronic apparatus by using the identification information of the electronic apparatus, at operation 1005. For example, the electronic apparatus may detect that the first device and the second device are communicatively connected with the electronic apparatus based on the identification information of the electronic apparatus. The electronic apparatus may detect a device communicatively connected to the electronic apparatus and identify the number of communicatively connected devices.

The electronic apparatus substantially simultaneously transmits AP identification information to one or more device connected with the electronic apparatus, at operation 1007. For example, in a case in which the electronic apparatus is communicatively connected with the first device and the second device, the electronic apparatus may substantially simultaneously transmit identification information (e.g., an SSID) of the access point to the first device and the second device. According to an embodiment, the electronic apparatus may transmit a password to connect with the AP to the device together with the identification information. The identification information of the electronic apparatus may include an SSID of the electronic apparatus.

The electronic apparatus may transmit information (e.g., identification information of the first device and identification information of the second device) relating to the communicatively-connected first device and the communicatively-connected second device to the server.

The term "module" as used herein includes units made up of hardware, software, or firmware, and may be used interchangeably with terms such as logic, logic blocks, components, or circuits. A "module" may be an integrally constructed component or a minimum unit or part thereof that performs one or more functions. "Module" may be implemented either mechanically or electronically and may include, for example, application-specific integrated circuit (ASIC) chips, field-programmable gate arrays (FPGAs) Programmable logic devices. At least a portion of a device (e.g., modules or functions thereof) or method (e.g., operations) according to various embodiments may be embodied as a command stored in a non-transitory computer readable media) in the form of a program module. When the command is executed by a processor, the processor may perform a function corresponding to the command. The computer-readable recording medium may be a hard disk, a floppy disk, a magnetic medium (for example, a magnetic tape), an optical recording medium (e.g., compact disc (CD)-ROM, digital versatile disc (DVD), magnetic-optical medium, a floppy disk), internal memory, etc. The instruction may include code generated by a compiler or code that may be executed by an interpreter. The module or a program module according to variety of embodiments may be configured by including at least one of the constituent elements described above, some of the constituent elements may be omitted, or other additional constituent element may be added. The module, a program module, or operations executed by other elements according to variety of embodiments may be executed consecutively, in parallel, repeatedly, or heuristically, or at least some operations may be executed according to a different order, may be omitted, or the other operation may be added thereto.

The above-described embodiments may be implemented as a software (S/W) program including an instruction stored in a computer-readable storage media.

The computer is an apparatus which is capable of calling a stored instruction from the storage medium and operating according to the above-described embodiment according to the called instruction, and may include an electronic apparatus according to the above-described embodiments.

A computer readable storage medium may be provided in the form of a non-transitory storage medium. Herein, the term "non-transitory" only denotes that a storage medium does not include a signal but is tangible, and does not distinguish the case where a data is semi-permanently stored in a storage medium from the case where a data is temporarily stored in a storage medium.

In addition, the electronic apparatus or method according to the above-described embodiments may be included in a computer program product and provided. The computer program product may be traded as a product between a seller and a consumer.

The computer program product may include an S/W program and a computer readable storage medium in which the S/W program is stored. For example, the computer program product may include a product (e.g., a downloadable app) in the form of an S/W program electronically distributed through an electronic apparatus, a manufacturer of a device or an electronic market (e.g., Google play store and App store). For electronic distribution, at least some of the S/W program may be stored in the storage medium or may be temporarily generated. In this case, the storage medium may be a server of a manufacturer, a server of an electronic market, or a relay server which temporarily stores an S/W program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A device management system comprising:
   a first device;
   a second device;
   an electronic apparatus;
   an access point; and
   a server configured to manage a user account and register the first device and the second device under the user account,
   wherein the electronic apparatus is configured to:
     store identification information of the access point in a memory of the electronic apparatus, and
     transmit the identification information of the access point,
   wherein each of the first device and the second device is configured to:
     receive the identification information of the access point transmitted from the electronic apparatus,
     establish a communication link with the access point by using the identification information of the access point, and
     access the server via the access point,
   wherein the electronic apparatus is further configured to:
     store an updated identification information of the access point, and
     transmit the updated identification information of the access point based on disconnecting the communication link with the access point.

2. An electronic apparatus configured to support a communicative connection of a first device and a second device and allow the first device and the second device to connect with a first access point, the electronic apparatus comprising:
   a communication interface;
   a memory; and
   at least one processor configured to control the communication interface and the memory,
   wherein the memory is configured to store instructions and, in response to the at least one processor executing the instructions, the at least one processor is further configured to control the electronic apparatus to perform operations comprising:
     storing first identification information of the first access point in the memory,
     transmitting the first identification information of the first access point to the first device and the second device for allowing the first device and the second device to establish a first communication link with the first access point,
     storing updated second identification information of a second access point, and
     transmitting the second identification information of the second access point to the first device and the second device based on disconnecting the communication link with the first access point for allowing the first device and the second device to establish a second communication link with the second access point.

3. The electronic apparatus as claimed in claim 2, wherein the first identification information of the first access point includes a first service set identifier (SSID) of the first access point, and the second identification information of the second access point includes a second service set identifier (SSID) of the second access point.

4. The electronic apparatus as claimed in claim 2, wherein the at least one processor is further configured to perform an operation of transmitting information relating to the first device communicatively connected with the electronic apparatus and the second device communicatively connected with the electronic apparatus to a server.

5. A communication setting method of a device management system, the communication setting method comprising:
 storing identification information of an access point with which an electronic apparatus is communicatively connected in a memory of the electronic apparatus;
 transmitting, by the electronic apparatus, the identification information of the access point; and
 receiving, by a device, the identification information of the access point transmitted from the electronic apparatus,
 establishing, by the device, a communication link with the access point by using the identification information of the access point;
 accessing, by the device, a server via the access point,
 storing, by the electronic apparatus, an updated identification information of the access point; and
 transmitting, by the electronic apparatus, the updated identification information of the access point based on disconnecting the communication link with the access point.

6. A communication setting supporting method of an electronic apparatus, the communication setting supporting method comprising:
 storing first identification information of a first access point in a memory of the electronic apparatus;
 transmitting the first identification information of the first access point to a plurality of home appliances via a communication interface of the electronic apparatus for allowing the plurality of the home appliances to establish a first communication link with the first access point;
 storing second identification information of a second access point; and
 transmitting the second identification information of the second access point based on disconnecting the first communication link with the first access point for allowing the plurality of the home appliances to establish a second communication link with the second access point.

7. The communication setting supporting method as claimed in claim 6, wherein the first identification information of the first access point includes a first service set identifier (SSID) of the first access point, and the second identification information of the second access point includes a second service set identifier (SSID) of the second access point.

8. The communication setting supporting method as claimed in claim 6, further comprising:
 transmitting information, relating to the plurality of the home appliances communicatively connected with the electronic apparatus, to a server.

* * * * *